United States Patent [19]

Imral

[11] 3,889,987

[45] June 17, 1975

[54] SHEET METAL "Y" ADAPTOR FOR DUCTS
[75] Inventor: Sadik S. Imral, St. Louis, Mo.
[73] Assignee: Intertherm, Inc., St. Louis, Mo.
[22] Filed: Dec. 4, 1974
[21] Appl. No.: 529,277

[52] U.S. Cl. ............................... 285/155; 285/424
[51] Int. Cl.² ...................................... F16L 41/00
[58] Field of Search .................... 285/155, 424, 152

[56] References Cited
UNITED STATES PATENTS

| 903,959 | 11/1908 | Crary | 285/155 X |
| 1,230,007 | 12/1917 | Milliken | 285/155 X |
| 1,455,027 | 5/1923 | Ludwig | 285/424 X |
| 3,290,066 | 12/1966 | Primich et al. | 285/424 X |

OTHER PUBLICATIONS
Adelta–Adelta Manufacturing Company, Inc., Catalog No. 55, Third Edition, Page 14, Sept. 1956.

Primary Examiner—Thomas F. Callaghan

[57] ABSTRACT

A "Y" adaptor, for dividing duct flow from an entrant opening to two diverging openings of approximately half its cross-section, is made from two similar body pieces of bendable flat sheet metal. Each has a pair of concavely arcuate edges extending to form a curvingly tapered tab. On bending the body pieces to bring their side edges and their tab portions curvedly to a common plane, fastening the side edges adjacent to the arcuate edges and then drawing the tab portions together around circular cuffs provides the diverging exit openings.

4 Claims, 4 Drawing Figures

SHEET METAL "Y" ADAPTOR FOR DUCTS

BACKGROUND OF THE INVENTION

One of the problems in installing duct work is to provide suitable adaptors for dividing the flow from a single passage of relatively large cross-section to two diverging passages whose combined cross-section approximately equals the cross-section of the first opening. Adaptors for so dividing the duct flow have not been fabricated with simplicity such as is commensurate with the cost requirements for inexpensive installation, as for example in installing air conditioners which supply refrigerated air to the ducts of mobile homes. Further, prior duct adaptors could be fabricated only at production facilities remote from the place of installation; this resulted in high shipping costs because of their bulk and hollowness.

SUMMARY OF THE INVENTION

The purposes of the present invention include providing a low-cost, simply fabricated "Y" adaptor for dividing duct flow, with adequate provisions for attachment at the entrant opening and the exit openings. A further purpose is to provide such an adaptor formed of bendable body pieces suited for shipment prior to assembly and capable of being assembled without factory tooling. Still further objectives will be apparent from the disclosure hereof.

Summarizing generally, I achieve these purposes by providing an adaptor body made up of two similar body pieces formed from bendable flat sheet metal. Each piece has a flow entrant edge whose length equals half the perimeter of the entrant opening, not counting the length of an overlap provision. Each body piece has two side edges extending from the flow entrant edge, terminating in a pair of symmetrical concavely arcuate edges which extend convergingly adjacent to each other whereby to form an elongated, curvingly tapered tab portion. The length of each of the concavely arcuate edges is substantially half that of the perimeter of the exit openings, not counting an overlap provision. On bending the body pieces to bring their side edges and their tab portions curvedly to a common plane, and on securing the side edges of the two pieces overlappingly at such common plane, and drawing the ends of the tab portions to each other, the adaptor body is formed with entrant and exit openings of desired size. Within the exit openings, circular sheet metal cuffs are provided, whose marginal portions are engaged by the arcuate side edges of the body pieces when the ends of the tab portions are drawn together.

DESCRIPTION OF THE PREFERRED EMBODIMENT

Figure 1:
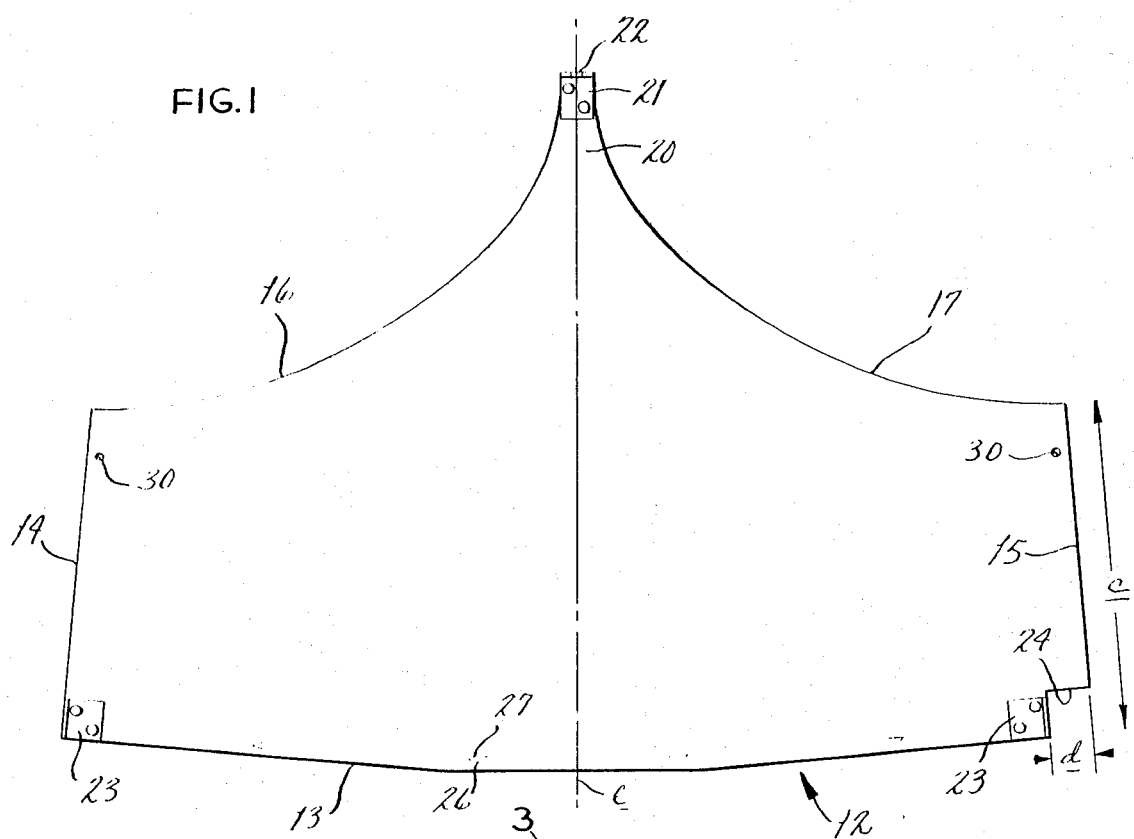
FIG. 1 is a plan view of one of the sheet metal body pieces prior to bending to form a half of the adaptor body.
Figure 4:
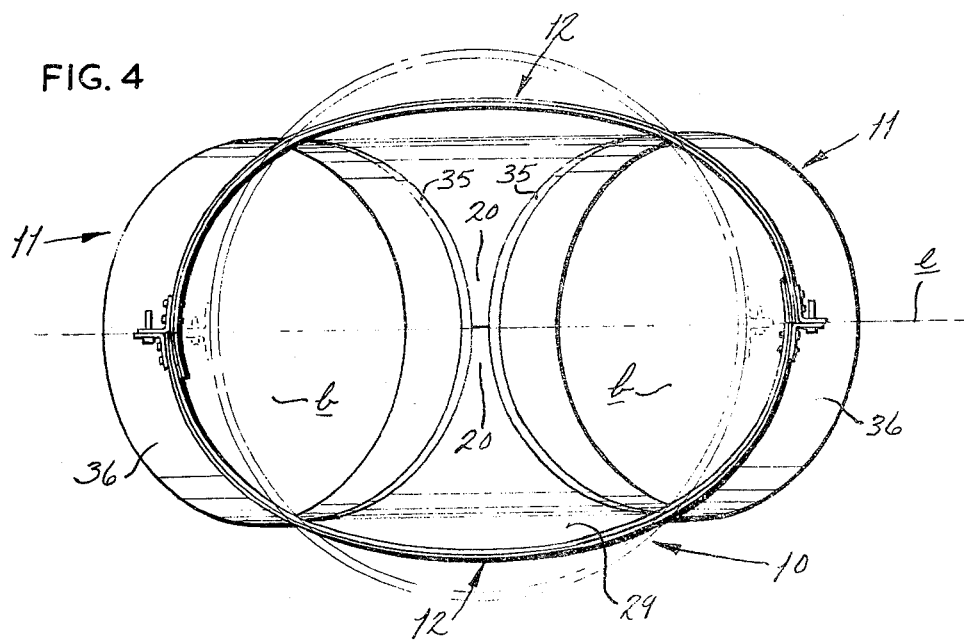
FIG. 4 is a bottom view of the adaptor of FIG. 2, the entrant opening being oval; the phantom lines show how said opening may be deflected to circular configuration.

The present adaptor is formed of a body generally designated 10 and two sheet metal cuffs generally designated 11. The body itself is comprised of two similar body pieces generally designated 12 formed from flat bendable sheet metal to the pattern of FIG. 1. The pattern there shown is suitable for forming relatively short adaptor bodies whose entrant opening has roughly the same total flow capacity as its two diverging exit openings $b$, as best seen in FIG. 4. If the proportions chosen are different from this disclosure, adjustments to the pattern of FIG. 1 may readily be worked out by trial and error.

As so seen in flat pattern, the body piece hase a long entrant edge 13 which is slightly convex, and from which extend two side edges 14, 15 at approximately right angles. The length of the side edges 14, 15 corresponds to the dimension $c$ shown on FIGS. 1 and 2; in the formed adaptor this will equal the length along the adaptor body side, to a point of divergence at which communicating ducts may be joined. The length of the entrant edge 13 will equal half the perimeter of the larger opening to the adaptor plus an overlap length $d$.

At the ends of the side edges opposite to the entrant edge 13 are a pair of symmetrical, concavely arcuate edges 16, 17 whose lengths are substantially equal to half the perimeter of the exit openings to be formed. The length of the arcuate edge 17 is of course increased by the length of the overlap $d$.

The arcuate edges 16, 17 extend from the side edges 14, 15 progressively further from the entrant edge 13, to converge toward and spacedly adjacent to each other, thereby forming an elongated, curvingly tapered tab portion 20. At its end, for securement to the end of the tab 20 of the other body piece 12, is riveted an angle 21 having a central bore 22.

Similar angles 23 are provided at the side edges 14, 15 adjacent to the entrant edge 13, the side edge 15 there having a cut-out 24 in the overlap $d$.

Figure 2:
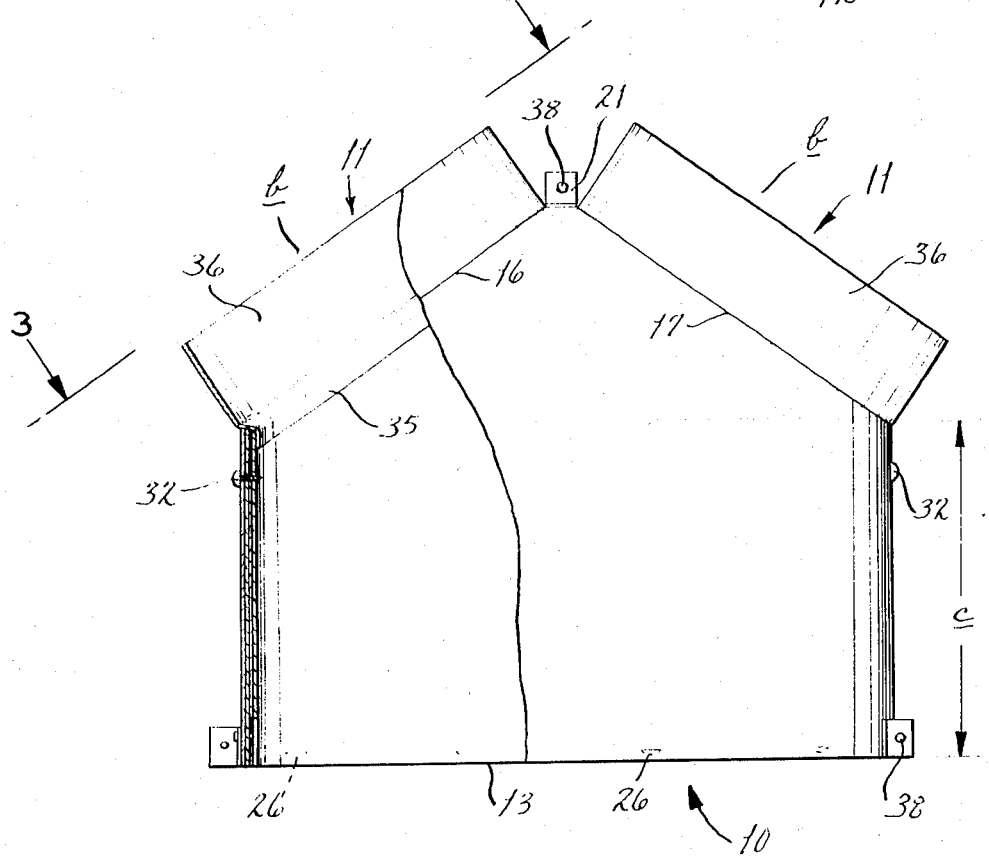
FIG. 2 is a side elevation of the completed adaptor.
Figure 3:
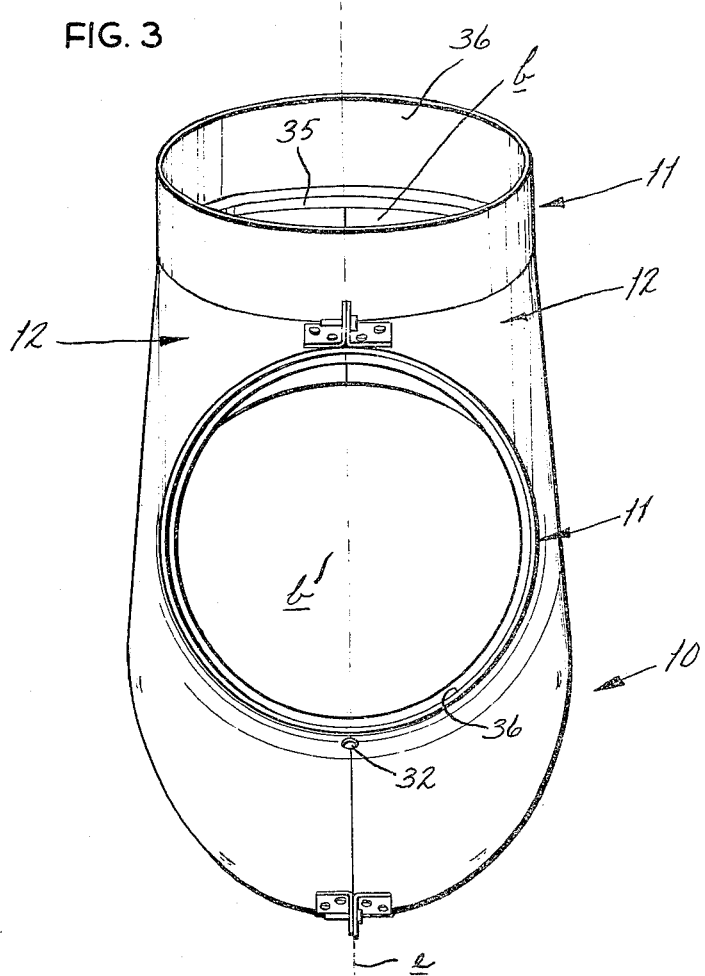
FIG. 3 is a true view thereof as seen along line 3—3 of FIG. 3.

Spaced inward from the entrant edge 13 at intervals of several inches are conventional half-oval detent tabs 26, depressed from the surface of the body piece 12 along slit lines 27. The size of the detent tabs 26 depends in part on what type of opening is to be grasped, and in part by whether a foam insulating sheet is to be used, such as the adhered foam insulation liner 29, which covers the inward projections of the tabs 26 as shown in FIG. 2. Near the intersection of the side edges 14, 15 and the arcuate edges 16, 17, are pierced holes 30 of small diameter such as will accommodate a screw or rivet.

The adaptor body is assembled as follows:

The body pieces 12 are bent to bring their side edges 14, 15 substantially to the common plane $e$ and form the entrant edge to half an ellipse as shown in FIG. 4. The tab portions 20 are likewise bent toward each other, bring their securement angles 21 to such common plane. With the overlap length $d$ of the side edges 15 positioned inwardly of the side edge 14 of the other body piece, pin-like members such as sheet metal screws 32 are secured through the pierced holes 30.

Circular sheet metal cuffs 11 are then introduced into the exit openings bounded by the arcuate edges 16, 17. Preferably, the cuffs 11 are formed with marginal portions 35 which are first joggled inwardly and flared somewhat outwardly from the cuff cylindrical portions 36.

With the flared marginal portions 35 seated inside the exit openings bounded by the arcuate edges 16, 17, the tab angles 21 are drawn together and secured by a sheet metal screw 38. The securement angles 23 at the ends of the entrant edge 13 are likewise to be drawn together by sheet metal screws 38. However this is completed on mounting the duct adaptor to the projecting flange of a device (such as an air conditioner) which is engaged by the detent tabs 26. When the angles 23 are drawn together, the insulation liner 29 serves as a gasket. The attachment of similar diameter ducts to the circular cuffs 11 is conventional.

By virtue of this flexibility of the body pieces 12 the present adaptor may fit on either a circular or an oval or elliptical entrant opening. Thus the phantom lines of FIG. 4 show how the entrant edges 13 are deflected to fit the adaptor onto a circular flange of a device from which air is conducted.

Note that herein the larger opening is spoken of as the entrant opening, while the smaller openings are referred to as exit openings. This terminology is used for convenience; obviously the present adaptor may be used as well for converging flows. One advantage of the present invention is that the body pieces 12 may be shipped only partly formed, and final assembly where the air conditioning device such as an air conditioner is to be installed. The use of a single pin-like member, such as a sheet metal screw 32 or a rivet, permits the body pieces to rotate angularly about each other, opening to engage the flange on the air conditioner or other device and closing toward each other as the angles 23 are drawn together to clamp the adaptor in place. Other variations of the present invention will, from this disclosure, be apparent to persons skilled in the art.

I claim:

1. A "Y" adaptor for dividing duct flow, from an entrant opening of larger cross-section to two diverging exit openings of smaller cross-section, comprising
    an adaptor body having
        two similar body pieces formed from bendable flat sheet metal, each being bounded by edges including
        a flow entrant edge whose length equals half the perimeter of such larger opening exclusive of an overlap provision,
        two side edges extending from the flow entrant edge approximately at right angles, whereby to establish a length along the adaptor body side to a point of divergence,
        a pair of symmetrical, concavely arcuate edges, each having a length substantially equal to half the perimeter of such exit opening,
        the said arcuate edges extending from said side edges progressively further from the entrant edge and convergingly adjacent to each other to form a tab portion,
    each tab portion so formed having a securement provision at its outstanding end,
    the body pieces having means adjacent to their side edges to secure them overlappingly,
    whereby on bending said body pieces to bring their side edges and tab portions curvedly to a common plane, and on securing the securement provisions of the tab portions to each other and securing the side edges at such plane, an adaptor body is formed having such entrant and exit openings.

2. A "Y" adaptor as defined in claim 1, together with circular sheet metal cuffs having marginal portions engaged within the exit openings.

3. A "Y" adaptor as defined in claim 2, wherein the tab securement provisions are adjustable, whereby to grasp said sheet metal cuffs and engage them within the exit openings.

4. A "Y" adaptor as defined in claim 1, wherein the means to secure the side edges of the body pieces overlappingly comprise a pin-like member through said side edges adjacent to the arcuate edges and an adjustable member secured to said side edges adjacent to the entrant edges, whereby angular rotation about the pin-like members on adjustment of the adjustable members will clamp the entrant opening to provide secure communication with an adjacent opening.

* * * * *